United States Patent [19]

Ogden

[11] 4,347,783

[45] Sep. 7, 1982

[54] BEVERAGE CARBONATOR DEVICE

[76] Inventor: Ralph Ogden, 1304 Fisher St., Munster, Ind. 46321

[21] Appl. No.: 251,476

[22] Filed: Apr. 6, 1981

[51] Int. Cl.³ ............................................. B01F 3/04
[52] U.S. Cl. ................................. 99/323.1; 99/323.2; 261/DIG. 7; 261/DIG. 27
[58] Field of Search ........................... 99/323.1, 323.2; 261/DIG. 7, DIG. 27, 124

[56] References Cited

U.S. PATENT DOCUMENTS

| | | | |
|---|---|---|---|
| 1,136,004 | 4/1915 | Gross | 261/DIG. 7 |
| 1,905,986 | 4/1933 | Jacobs et al. | |
| 2,447,716 | 8/1948 | Rowe | 261/DIG. 7 |
| 2,600,901 | 6/1952 | Meldau | 261/121 |
| 2,606,749 | 8/1952 | Bayers | 261/DIG. 7 |
| 3,480,403 | 11/1969 | Hovey | 99/323.1 |
| 3,480,493 | 11/1969 | Hovey | 23/282 |
| 4,040,342 | 8/1977 | Austin et al. | 99/323.1 |

*Primary Examiner*—Harvey C. Hornsby
*Assistant Examiner*—Christine A. Peterson
*Attorney, Agent, or Firm*—McWilliams, Mann & Zummer

[57] ABSTRACT

A beverage carbonator device comprising an outer main container for holding the beverage as it is being, and after it is, carbonated, which is open at its upper end and has a beverage dispensing off-on control valve or spigot at its lower end, and a carbonation generating and pressure regulating assembly arranged for mounting within the container in sealed application to the container open end. The assembly includes a lower carbonating gas generating tank that is to receive and contain the carbonating gas generating substances, which tank is removably connected in sealed relation to an orificed floor of a carbonating gas receiver that is closed at its upper end by a flexible diaphragm, with the receiver in turn being secured to a cover that is part of the assembly and that is sealingly applied to the container upper end. The diaphragm is exposed to a vented breathing chamber it defines with the cover, and the diaphragm is spring biased inwardly of the receiver and carries a link that is operatively connected to a control valve for the receiver floor orifice for controlling the pressure of the carbonating gas in the container that is supplied thereto from a gas emitting conduit connected to the receiver for that purpose, to maintain the carbonating gas in the container at a substantially uniform predetermined level.

8 Claims, 4 Drawing Figures

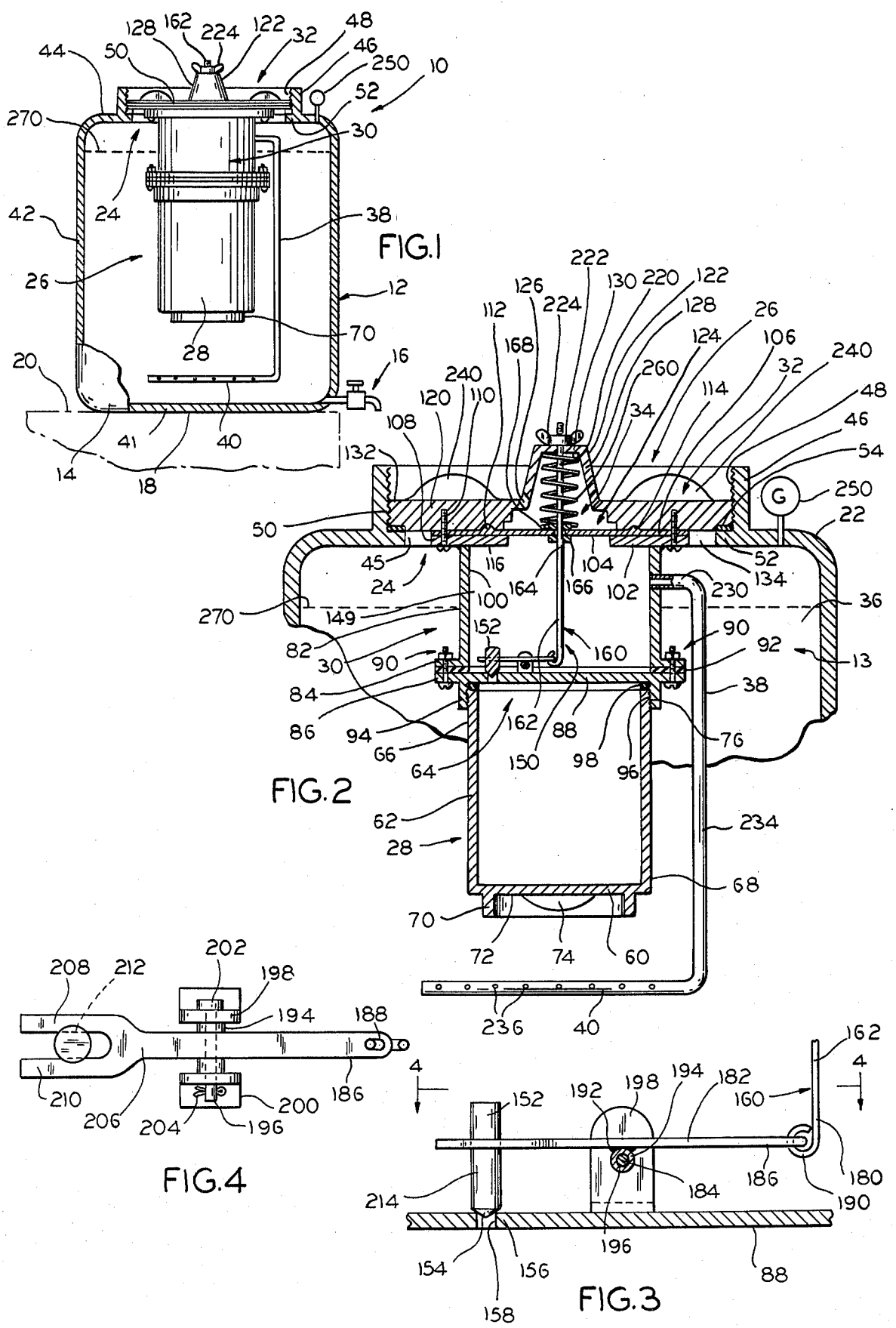

BEVERAGE CARBONATOR DEVICE

This device relates to a device for carbonating beverages, and more particularly, to a beverage carbonating device especially adapted for home use.

Carbonated beverages are widely consumed, and a number of companies are profitably engaged in merchandising the various brands of canned and bottled products of this type. These beverages sell for a relatively high price considering that the product is mostly carbonated water that includes flavoring and sugar. The cost of canning or bottling and packaging the various products involved and transporting them to the place of sale is considerable, to which must be added, insofar as the consumer is concerned, the cost and time and money to acquire the product containers involved and transfer them to the consumer's home or other place where the contents will be consumed. On top of that is the problem of disposing of the empty containers, either by way of return, if deposit on return is involved, or by way of proper trash disposal where the container is disposable. Where the container is of the disposable type, its cost is frequently greater than the cost of the beverage it contains.

The preparation of carbonated water is simply and easily performed. All that is required is the water, sugar, yeast, and a closed container to force the evolving carbon dioxide into solution. At one time it was popular for the consumer to make root beer and other carbonated beverages, which became known colloquially as "home brew". For making root beer, required was the root beer extract, yeast, sugar, and the necessary bottles into which both the beverage to be consumed and the fermenting substances were placed in suitable formulation, after which the bottles were capped. After a few days at room temperature, the carbon dioxide evolving from the action of the yeast on the sugar would have effected carbonation of the bottled beverage.

A major disadvantage of this method is that the yeast remains in the beverage, and thus continues to produce carbon dioxide and alcohol as well, thereby depleting the sugar. Thus, the precise controlling of the carbonation was very difficult and it was found to be necessary to consume the beverage as soon as the amount of carbon dioxide necessary for the desired taste has been formed. Even so, as the yeast remained in the beverage, it added an unpleasant taste to the beverage, and tended to create digestive discomforts in many people. Further, the presence of the yeast in the beverage left a milky appearance which was not pleasant to look at.

Of course, continued fermentation of the beverage components in the bottles continued to lead to pressure build ups that could and sometimes did result in explosion of the bottle.

The popularity and desirability of carbonated beverages have induced numerous efforts to devise beverage carbonating devices that will permit home carbonation of the beverages by the consumer without these accompanying difficulties. One major problem that has plagued the successful development of this type of device, from a practical standpoint, is insuring that only the carbonating gas reaches the beverage to be carbonated, since, as indicated, the yeast, if it gets into the beverage, adversely affects the quality and potability of the beverage.

Another problem that has been encountered in connection with the development of devices of this type is that as the beverage is withdrawn from the device, typically under the pressure of its dissolved carbon dioxide, the carbonation of, and the resulting pressure on, the beverage remaining in the device decreases with each withdrawal, with the result that the final amounts withdrawn may well be and frequently are "flat" or devoid of carbonation.

A principal object of the present invention is to provide a beverage carbonator device especially suited for home use that combines the gas generation and all the materials involved in connection with the gas generation to a chamber that is isolated from the beverage, with only the gas generated being supplied to the beverage, and in a controlled manner, so as to maintain any and all of the beverage remaining to be dispensed, from a particular beverage batch made up, under a predetermined carbonating pressure that insures that the last of the beverage as drawn from the device will be just as potable as the first.

Another principal object of the invention is to provide a beverage carbonator device especially suited for consumer use that includes an outer main container or vessel in which the beverage to be carbonated is contained and retained for dispensing purposes, and the separate carbonation generation and pressure regulating assembly that is removably mounted in the main vessel or container, and that is disposed therein, which includes a removable tank to which the gas generating materials are applied, and in which same are retained while a particular beverage charge or batch is held available for dispensing, and which provides for automatic regulating of the carbonating gas for supply of same to the beverage so as to maintain the beverage under substantially uniform carbonating pressure conditions so long as any part of the beverage remains to be dispensed.

A further principal object of the invention is to provide a beverage carbonating device especially adapted for home use that is adapted to use both the fermentation or chemical reaction methods of generating the carbonating carbon dioxide, and with equal facility.

Another important object of the invention is to provide a beverage carbonating device especially adapted for home use that is composed of few and simple parts, that is economical to manufacture, and that is convenient and reliable in use.

In accordance with the invention, a beverage carbonator device especially suited for home use is provided comprising an outer main container for holding the beverage to be carbonated, and for dispensing the beverage after it is carbonated, which container is open at its upper end for receiving a special carbonating carbon dioxide gas generating and pressure regulating assembly, which assembly is applied in sealed relation to the container with the basic assembly components disposed therein. The carbonation generating and pressure regulating assembly comprises a lower carbonating gas generating tank that is to receive and contain the carbonating gas generating substances, on which is superimposed a carbonating gas receiver. The receiver is essentially a closed drum like structure having a floor formed with an orifice, with the tank being removably connected in sealed relation to the receiver below its floor. At its upper end the receiver is closed by a flexible diaphragm, with the receiver upper end being secured to a cover for the container that in turn is sealingly applied to the container. with the tank and much of the receiver immersed in the beverage to be carbonated.

The receiver has connected thereto a carbon dioxide conducting conduit that has a discharge end which is disposed underneath the tank and spaced therefrom and is formed for appropriate injection of the gas into the beverage.

The receiver diaphragm is exposed to a vented breathing chamber it defines with the cover and the diaphragm is spring biased inwardly of the receiver and carries a link that is operatively connected to a valve member that cooperates with the receiver floor orifice, for controlling the venting of the carbon dioxide gas from the tank to the receiver, and thus the carbonating of the beverage, in accordance with the objects of the invention.

The arrangement of the receiver diaphragm, valve member, and the means for articulating the diaphragm to the valve member for controlling the passage of the gas from the tank to the receiver are such that the pressure of the carbonating carbon dioxide gas in the container for beverage carbonating purposes is maintained at a predetermined level for insuring that the carbonation of the beverage remains the same within the container until it is totally dispensed.

Further, the arrangement is such that only the carbonating carbon dioxide gas reaches the beverage to be carbonated, with the gas generating substances being held totally isolated from the beverage both while the initial carbonating procedures are being effected, and as long as any part of the beverage remains in the container for dispensing purposes.

Other objects, uses, and advantages will become obvious or apparent from a consideration of the following detailed description and the application drawings.

In the drawings:

FIG. 1 is a diagrammatic side elevational view illustrating one embodiment of the invention, with the beverage container itself shown largely in section to better illustrate in elevation the carbonation gas generating and pressure regulating assembly as part of the basic device of this invention, and that in FIG. 1 is shown in its operating position;

FIG. 2 is a fragmental view similar to that of FIG. 1, but showing only the upper fragment of the beverage container and with the carbonating gas and pressure regulating assembly shown in section;

FIG. 3 is a fragmental view showing on an enlarged scale the cooperating valve member and receiver floor orifice that are shown in FIG. 2; and FIG. 4 is a fragmental plan view taken substantially along line 4—4 of FIG. 3.

However, it is to be distinctly understood that the specific drawing illustrations provided are supplied primarily to comply with the requirements of the Patent Laws, and that the invention is susceptible of variations and modifications that will be obvious to those skilled in the art, and which are intended to be covered by the appended claims.

GENERAL DESCRIPTION

Reference numeral 10 generally indicates the beverage carbonator device as a whole, which comprises beverage containing and dispensing container or vessel 12 that is equipped at its lower end 14 with a suitable dispensing off-on control valve or spigot 16 that may be of any suitable conventional type. Container 12 at its lower end 14 defines flat bottom portion or floor 18 that, in use of the device 10, may rest on top of a suitable table or counter indicated at 20.

The container 12 at its upper end 22 is open as indicated at 24 to receive in sealed relation to the container the carbonating gas generating and pressure regulating assembly 26 which comprises a receptacle or tank 28 in which the carbonating gas generating substances are to be received, which is removably connected in sealed relation to carbonating gas receiver or drum 30 that is in turn secured to the special container cover 32 that is to be applied to the container 12 in sealed relation thereto.

Operatively associated with the receiver 30 and cover 32 is a pressure regulating device 34 (see FIG. 2) that functions to control the supply of the carbonating gas that is to be supplied to the beverage 36 and container 22, from receiver 30 through conduit 38 that in the form illustrated includes gas discharge portion 40, that in the assembled relation of the device 10 is to be disposed adjacent the lower portion 14 of container 12. The tank 28, in accordance with the invention, in addition to serving as the gas generator, also serves as a gas accumulator, with the release of the accumulated gas in tank 28 to the beverage being controlled by regulating device 34.

As will be clear from the specific disclosure that follows hereinafter, the pressure regulator device 34 functions to control the supply of the carbonating gas to the carbonating chamber 13 (that is defined by the container 12) so that it is restored to and maintained at a substantially uniform predetermined pressure level as needed, so long as any of the beverage 36 remains in the container 22 for dispensing purposes. Thus, the device 10 functions to insure that the final amount of the beverage 36 that is withdrawn from the container 12 will be of the same pottable carbonated quality as the first amounts of the beverage that are in dispense of the container 22 after carbonating of the beverage 36 has been completed.

SPECIFIC DESCRIPTION

The container 12 may be of any suitable type or configuration adapted to receive a beverage 36 to be carbonated for home or other consumer use, as, for instance, in fast food facilities or the like.

The container 12 is preferably formed from a suitable metallic or polymeric material that provides adequate safety factors for containing the internal pressures as to be subjected to by the beverage carbonating objectives of the invention. In the form illustrated, container 12 is essentially cylindrical in configuration defining bottom wall 40 that forms the container bottom 18, circumambient side wall 42, and top wall 44 that is shaped to define aperture 45 that forms opening 24. While the specifics of the container 12 may be of any suitable type from an engineering fabrication and manufacturing standpoint, in accordance with the invention the arrangement is to be such that the cover 32 is to be applied to the container opening 24 in seal tight relation thereto. For this purpose, in the form illustrated, the container is equipped with an upstanding annular flange 46 internally threaded as at 48 for cooperation with corresponding external threading 50 of the cover 32 for securing the cover 32 to the container. The positioning of the flange 46 relative to the container opening 24 forms a circumambient ledge portion 52 on which suitable seal 54 is applied for purposes of creating the necessary fluid tight seal between cover 32 and container 22.

Referring now to the carbonating gas generating and pressure regulating assembly 26, the receptacle or tank 28 comprises bottom wall 60 that is integral with upstanding circumambient side wall 62 that is open as at 64 at the tank upper end 66. The tank 28 at its lower end 68 may be formed with depending annular flange 70 to serve as a pedestal for the tank 28 on which it may be rested, as by being placed on table 20, when it is being loaded or charged with the gas generating substance. In the particular form shown, the underside 72 of the tank bottom 60 is formed with planar protuberance 74 that in practice would be centrally located on the axial center of the tank 28 to serve as a handle for turning same relative to receiver 30 for threaded connection thereto, the tank side wall 62 being externally threaded as indicated at 76 for this purpose.

The receiver or drum 30 generally comprises circumambinet side wall 82 that in the form illustrated is externally flanged as indicated at 84 for connection to the corresponding flange 86 of the receiver floor or base plate 88. In the specific form illustrated, the receiver floor or base plate 88 is secured to the receiver flanging 84 by employing suitable nut and bolt devices 90, with suitable seal 92 being interposed therebetween.

The receiver floor base plate 88 is formed with depending securement flange 94 that is internally threaded as at 96 for threaded connection with the external threading 76 of the tank side wall 62. As indicated in FIG. 2, for sealing purposes, the tank 28 is turned up against the receiver floor base plate 86 with suitable O ring seal or the like 98 being interposed therebetween for sealing this connection against fluid leakage from or into the beverage 36.

The receiver 30 at its upper end 100 has affixed thereto, as by employing welding or the like, an annular disc 102 on top of which is applied flexible elastomeric diaphragm 104 of the pressure regulating device 34, with the outer margin 106 of the diaphragm being clamped between the disc 102 and the cover 32, as by securing the outer margin 108 of the disc 102 to the cover by employing suitable securing bolts or screws 110 at suitably located spaced apart points about the margin 108 of disc 102. Diaphragm 104 in the form illustrated is formed with suitable annular sealing ridge 112 that is seated in annular recess 114 of the cover for sealing purposes, the inner margin 116 of the disc 104 underlying the corresponding portion of the diaphragm for bracing purposes, in the illustrated embodiment.

The cover 32 comprises a rounded plate member 120 of generally disc like configuration having an upstanding centrally located, upstanding protuberance 122 that defines with diaphragm 104 breathing chamber 124 that is vented to the ambient air through one or more suitable apertures 126. In the specific form shown, the protuberance 122 comprises upstanding side wall 128 that is of frusto conical configuration and terminates in a planar top wall 130 that serves an important function with the pressure regulating device 34, as will be described hereinafter. Cover forming member 120 has its perimeter portion 132 suitably formed to define the indicated threading 50 for cooperation with the vessel threading 48. The underside 134 of the cover forming member 120 is planar or flat for good clamping cooperation against the diaphragm 104, except for its annular groove 114 that cooperates with the sealing ridge 112 of the diaphragm. Receiver 30 defines pressure cavity 149.

The pressure regulating device 34 comprises in addition to the diaphragm 34 a valve device 150 that comprises valve member 152 having a valve head 154 (see FIG. 3) of suitable contour to cooperate with a valve seat 156 formed about a carbonating gas passing orifice 158 that is formed in the receiver floor 88 to pass the carbonating gas being formed and accumulated in tank 28 into the receiver 30. The valve member 152, in accordance with the invention, is operated by diaphragm 104 through link 160 that is in the form of an elongate rod 162 that is located in alignment with the central axis of diaphragm 104 and that extends therethrough; for purposes of securing the rod 162 to the diaphragm 104, the rod is suitably threaded as at 164 for threaded application on either side of diaphragm 104 of the respective nuts 166 and 168 which are turned against the diaphragm for sealed connection of the rod member 162 thereto when the rod member 162 is properly positioned relative to diaphragm 104. For this purpose, suitable washers (not shown) may be interposed between the respective nuts 166 and 168 and the corresponding side of diaphragm 104.

The rod 162 at its lower end 180 is pivotally connected to suitable lever member 182 that is pivotally mounted on the receiver floor 88 for fulcruming around axis 184, with the lever member 182 having a suitable connection to the valve member 152. In the form shown, lever member 182 is of flat or plate configuration defining at one end 186 of same a suitable aperture 188 to receive the looped end 190 of rod member 162 for pivotal connection purposes. Member 182 has suitably fixed to the underside of same, as by welding or brazing at 192, suitable sleeve 194 that is pivotally mounted on pivot pin 196 that is suitably mounted between two spaced apart brackets 198 and 200 that are in turn suitably secured or made fast to the receiver floor 88, as by employing welding or the like. In the form shown, the brackets 198 and 200 are illustrated as being of the angle type, and pin 196 is headed as at 202 at one end of same and receives suitable fastner 204 at the other end of same to hold the pin in mounted relation.

The lever member 182 at its end 206 is bifurcated to define a pair of spaced apart arms 208 and 210 that are slidably received in slot 212 formed in the side wall 214 of the valve member 152 for purposes of keying the lever member 182 to valve member 152. When the valve member 152 is applied to lever member 182 is suitably centered relative to orifice 158, the valve member may be suitably bonded to the lever member 182, as by employing a suitable adhesive, brazing, or the like.

Rod member 162 at its upper end 220 projects through aperture 222 formed in the protuberance top wall 130 for threaded connection to wing nut 224 for purposes that will hereinafter be made plain.

Receiver 30 has connected to its side wall 82 one end 230 of the conduit 38 which is formed to have a rectilinear portion 234 of same extend axially of the assembly 26, or downwardly of the device 20 in its assembled relation, which merges into the lower portion 40 that is thus angled at right angles to the rectilinear portion 234, and that is formed with gas emitting orifices 236 of a suitable configuration and shaping for defusing the gas generated by the device 10 into the beverage 36. The lower portion 40 may be of rectilinear of annular configuration, as desired, but preferably lies in a plane that substantially parallels that of base plate 88.

The cover 32 may be formed with suitable diametrically opposed upstanding planar protuberances 240 for serving as handles to turn the cover 32 to its closed relation relative to container 12.

The device 12 may be equipped with a suitable pressure gauge 250 that is suitably mounted in the container 12, and preferably at its top wall 44 for a direct reading of the carbonating pressure within container 12 when it is in use.

Interposed between the diaphragm 104 and the protuberance wall 130 is suitable helical compression spring 260 for biasing the diaphragm downwardly of the cover 26, which direction would thus tend to move the valve device 150 to its open position.

The pressure regulating device 34 and its valve device 150 are to be proportioned and arranged so that, unless the biasing action of spring 260 is overcome, when the carbonating carbon dioxide gas is generated in tank 28, the regulating device 34 will maintain orifice 158 open until the pressure in the chamber 13 reaches the desired predetermined pressure level, at which point the corresponding pressure in the receiver 82 will sufficiently deflect diaphragm 104 against the action of biasing spring 260 to cause device 34 to close the orifice 158.

However, even with the orifice 158 closed, generation of the carbon dioxide carbonating gas will continue with tank 28, and thus it accumulates in tank 28 until again needed in the container 12. On each withdrawal of the carbonated beverage 36 from the container 12, the pressure within the container 12 is of course reduced, which will involve the pressure regulating device 34 functioning, by reason of the correspondingly reduced pressure within the receiver 30, to move rod member 162 downwardly to an open orifice 158, under the biasing action provided by spring 260. When the pressure again has built up to the desired level within the chamber 36, the pressure in receiver 30 will have built up a corresponding amount, to the extent that diaphragm 104 is moved upwardly sufficiently against the biasing action of spring 260, whereby regulating device 34 then closes the valve device 150.

In assembling the assembly 26, and specifically, receiver 30 and cover 32, the receiver floor or base plate 88 first has valve device 150 applied thereto including rod 162, after which base plate 88 and seal 92 are made fast to the flange 84 of the receiver 30. Assuming annular plate 102 has been made fast to reciever side wall 82, diaphragm 104 has rod 162 applied thereto in the manner indicated, with nuts 166 and 168 being adjusted as needed for proper orientation of valve device 150. The plate 102, diaphragm 104 and cover are then assembled in the manner indicated, with rod 162 receiving spring 260 and extending through protuberance 122 for reception of nut 224. Conduit 38 is applied to receiver 30 at any convenient point in its assembly.

In use, the assembly 26 is separated from the container 12, and the container 12 is filled with the beverage to be carbonated. While the amount of the beverage 13 to be so applied to the container 12 is, of course, optional, it is suggested that the amount be such that when the device 20 is assembled in its operating relation, the beverage level will be approximately as indicated at 270.

The tank 28 is disconnected from the receiver 30 and sat in an upright position on the table or counter 20 or the like, adjacent container 12, and has applied to same the carbon dioxide gas generating substances that may be employed.

Where the fermentation carbon dioxide gas generation type method is to be employed, the tank 28 has applied to same a suitable quantity of an aquous solution of a suitable sugar, into which is applied yeast; the yeast is preferably contained in a packet formed by suitable membrane materials similar to the manner in which tea leaves are packaged in a tea bag whereby the liquids have gradual access to the yeast through the pores of the membrane and the resulting gas leaves the packet through the membrane pores for serving as the carbonation gas in accordance with the invention.

Alternately, the carbonating substances applied to tank 28 may be of the type used for chemical generation of carbon dioxide and may be, for instance, citric acid in tablet or dry form and sodium bicarbonate or the like mixed therewith, which may be packaged together in a manner similar to that suggested for the yeast, to which is applied a suitable charge of water.

In any event, when the charging or loading of tank 28 is complete, the tank 28 is made fast to receiver 30, as by being turned into secured sealing relation with respect to same, as suggested in FIG. 2. To conserve the carbon dioxide gas that is being generated, wing nut 224 is turned to draw rod member 162 upwardly to set valve member 152 in firm closed relation with the orifice 158.

The assembly 28 is then applied to the container 12, as by inserting the depending conduit 38, the tank 28, and the receiver 30 into the container through its opening 24 and then turning the cover 32 to seat same in sealed leak free relation with the seal 54. The wing nut 124 is then turned relative to rod member 162 to shift the rod member 160 downwardly so as to dispose the valve member 152 in its open relation with regard to the orifice 158, and at the position relative to receiver floor 88 that will permit the regulating device 34 to close the valve device 150 when the carbonating pressure in the chamber 13 reaches the desired level as indicated by the gauge 250.

With the valve device 150 in its open position, the carbon dioxide gas generated in tank 28 passes through orifice 158 into the receiver pressure cavity 149, and as the pressure from the gas within receiver 30 builds up, the gas passes from pressure cavity 149 into and through conduit 38 for emission into the beverage 36 in carbonating relation thereto. As indicated, when the pressure of the carbonating gas within the container 12, and exteriorly of the assembly 26, builds up to the desired level as indicated by gauge 250, diaphragm 104 in flexing outwardly of receiver 130 in response to the corresponding pressure levels within the receiver pressure cavity actuates the valve device 150 to close the orifice 158 by seating valve member valve end 154 against valve seat 156.

When one desires to have a drink of the beverage 36 as carbonate, he actuates the valve or spigot 16 to open same, and the beverage discharges from the valve or spigot 16, under the carbonating pressure in chamber 13, into a suitable container. Closing of the valve of spigot stops the beverage flow. As indicated, the portions of the carbonated beverage are drawn off from the container 12 while the pressure of the carbonating gas in chamber 13 will drop, with a corresponding drop in pressure within receiver 30, atmospheric pressure acting on diaphragm 104 through the breathing chamber 124 actuates the valve device 150 through link 160 to open orifice 158 and hold it open until the pressure levels within the chamber 13 have again built up to a desired carbonating pressure level within the chamber 13, at which point the resulting pressures within the receiver 30 will again deflect the diaphragm 104 upwardly as needed to close the valve device 150 until another portion of the beverage is drawn from the container 12.

It will therefore be seen that the invention provides a beverage carbonating device of simplified construction that is suited for consumer use of the beverage directly from the container 12, either for home generating purposes or fast food facility operating purposes, or the like. The carbonation generating and pressure regulating assembly is operable with either fermentation type or chemical type carbon dioxide generating substances, and keeps such substances fully isolated from the beverage to be consumed. All that reaches the beverage to be consumed is the carbonating carbon dioxide gas, and this is done in a controlled manner to in essence keep the carbonating pressures acting on the beverage at approximately the levels desired for good quality drinking purposes regardless of how much of the beverage may remain in the container. Thus, the last of a particular beverage charge in the container 12 to be withdrawn therefrom will be as of good drinking quality as the first portion so withdrawn or any other portions so withdrawn.

While the component parts of the device may be made of any suitable materials, stainless steel would be satisfactory for the metallic components involved that will come in contact with the beverage 36 and/or be subject to the pressure levels indicated.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A beverage carbonator device comprising:
   an outer container open at its upper end and defining a beverage carbonation chamber and including means for selectively dispensing a carbonated beverage, when contained therein, therefrom,
   and a carbonation generation and pressure regulating assembly adapted to be mounted in said chamber and comprising:
   a lower generator tank that is open at its upper end and is adapted to receive and contain carbonating gas generating substances,
   a carbonating gas receiver including means at its lower end for removably securing said tank upper end thereto in sealed relation therewith,
   said receiver defining an imperforate floor that spans said tank upper end, with said floor defining an orifice opening,
   said receiver having an open upper end that is spanned by a flexible diaphragm in sealed relation thereto,
   said receiver defining between said floor and said diaphragm a pressure cavity adapted to receive carbonating gas from said tank through said orifice,
   a cover secured to said receiver upper end in sealed relation to said diaphragm,
   said cover being formed to define with said diaphragm a vented breathing chamber, whereby said diaphragm deflects upwardly of said cavity under the pressure of carbonating gas received in said pressure cavity,
   a valve member mounted within said receiver for opening and closing said orifice,
   an elongate valve member actuator link secured to said diaphragm and having a depending portion disposed within said cavity,
   means for resiliently biasing said diaphragm inwardly of said cavity and toward said floor against the action of said gas in said cavity on said diaphragm,
   a gas conduit connected to said receiver in communication with said pressure cavity at one end thereof and extending exteriorly of said assembly and having the other end of same disposed below the level of said tank and formed for emitting gas into the beverage,
   means for securing said assembly to said container in sealed relation with said container with said tank and gas conduit other end disposed in the beverage to be carbonated,
   and means for articulating said link depending portion to said valve member for positioning said valve member relative to said orifice under the control of said diaphragm for maintaining the carbonating gas in said container at a substantially uniform predetermined pressure.

2. The beverage carbonator set forth in claim 1 wherein:
   said actuator link extends through said diaphragm in sealed relation thereto and has an upwardly projecting end portion extending exteriorly of said cover,
   and means for adjustably securing said link end portion to said cover for holding said valve member seated in sealing relation to said orifice for permitting preliminary build up in said tank of the pressure of the carbonating gas being generated in said tank.

3. The beverage carbonator set forth in claim 2 wherein:
   said end portion of said link extends through said breathing chamber,
   and wherein said biasing means comprises a helical spring interposed between said diaphragm and said cover in substantial concentric relation to said link.

4. The beverage carbonator set forth in claim 1 wherein:
   said other end of said gas conduit is disposed in underlying relation to and is spaced from said tank and defines a rectilinear multiorifice terminal section that substantially parallels said tank floor.

5. The beverage container set forth in claim 1 wherein said articulating means comprises:
   a lever member pivotally mounted in first class lever relation on said receiver floor, and having one end of same operably connected to said valve member and the other end of same operably connected to said link depending portion.

6. In a beverage carbonator device that comprises a container open at its upper end and defining a beverage carbonation chamber and including means for selectively dispensing a carbonated beverage, when contained therein, therefrom,
   a carbonation generation and pressure regulating assembly therefor adapted to be mounted in said chamber and comprising:
   a lower generator tank that is open at its upper end and is adapted to receive and contain carbonating gas generating substances,
   a carbonating gas receiver including means at its lower end for removably securing said tank upper end thereto in sealed relation therewith,
   said receiver defining an imperforate floor that spans said tank upper end, with said floor defining an orifice opening, said receiver having an open upper end that is spanned by a flexible diaphragm in sealed relation thereto, said receiver defining between said floor and said diaphragm a pressure cavity adapted to receive carbonating gas from said tank through said orifice, a cover secured to said receiver upper end in sealed relation to said diaphragm, said cover being formed to define with said diaphragm a vented breathing chamber, whereby said diaphragm deflects upwardly of said cavity under the pressure of carbonating gas received in said pressure cavity, a valve member mounted within said receiver for opening and closing said orifice, an elongate valve member actuator link secured to said diaphragm and having a depending portion disposed within said cavity, means for resiliently biasing said diaphragm inwardly of said cavity and toward said floor against the action of said gas in said cavity on said diaphragm, a gas conduit connected to said receiver in communication with said pressure cavity at one end thereof and extending exteriorly of said assembly and having the other end of same disposed below the level of said tank and formed for emitting gas into the beverage when said assembly is secured to the container in sealed relation with the container, with said tank and gas conduit other end disposed in the beverage to be carbonated, and means for articulating said link depending portion to said valve member for positioning said valve member relative to said orifice under the control of said diaphragm for maintaining the carbonating gas in said container at a substantially uniform predetermined pressure.

7. The beverage carbonator set forth in claim 6 wherein:

said actuator link extends through said diaphragm in sealed relation thereto and has an upwardly projecting end portion extending exteriorly of said cover, and means for adjustably securing said link end portion to said cover for holding said valve member seated in sealing relation to said orifice for permitting preliminary build up in said tank of the pressure of the carbonating gas being generated in said tank.

8. The beverage carbonator set forth in claim 7 wherein:

said end portion of said link extends through said breathing chamber, and wherein said biasing means comprises a helical spring interposed between said diaphragm and said cover in substantial concentric relation to said link.

* * * * *